Sept. 25, 1962
W. W. McELRATH
3,055,078
MACHINE FOR PROCESSING NON-SHRINKING
FIBROUS MATERIALS
Filed July 5, 1957
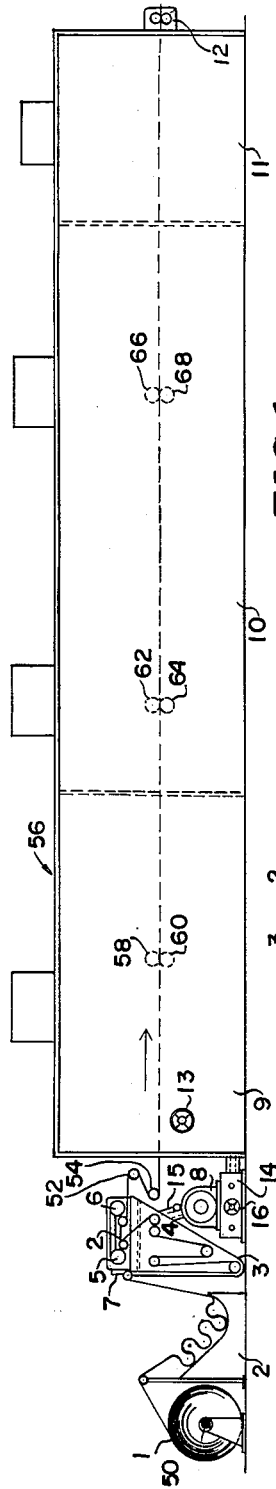
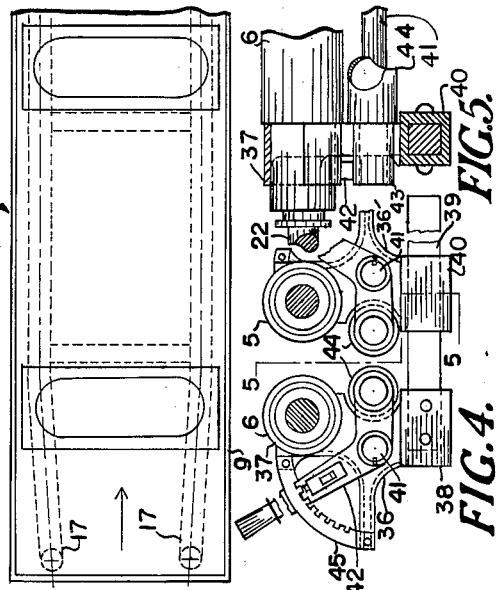
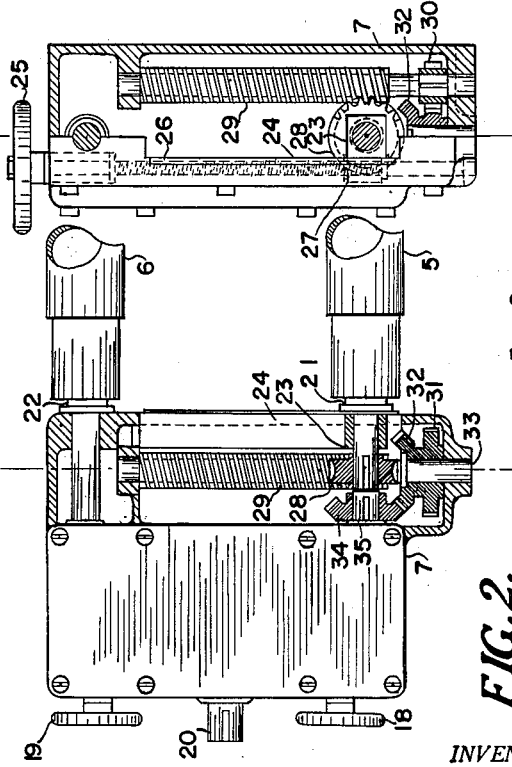
INVENTOR.
WILLIAM W. McELRATH
BY
Cushman, Darby & Cushman
ATTORNEYS

United States Patent Office 3,055,078
Patented Sept. 25, 1962

3,055,078
MACHINE FOR PROCESSING NON-SHRINKING FIBROUS MATERIALS
William W. McElrath, 1017 2nd St. SW., Roanoke, Va.
Filed July 5, 1957, Ser. No. 670,295
12 Claims. (Cl. 26—1)

This invention relates to a machine for processing fibrous materials, such as yarns, threads, tow cords and woven material. More specifically, it is concerned with a machine for treating or impregnating such materials with various solutions, including synthetic resins and subsequently stretching, drying, or drying and curing said resins under certain definite, positive and controlled tensioned conditions which process is shown in more detail in my copending application, Serial No. 670,296, filed July 5, 1957, and now U.S. Patent No. 2,977,665, the entire disclosure of which is hereby incorporated by reference.

Various benefits can be obtained by processing fibrous materials, such as those above mentioned with thermoplastic and thermosetting resins, e.g., polymeric acrylates such as ethyl acrylate resin and melamine-formaldehyde resins, while under controlled tension. Many physical properties are improved resulting in greater dimensional stabilization, resistance to shrinkage, chemicals, wear, tear, wrinkle and crock, as well as to stress and strain. However, in order to accomplish these benefits, it is necessary in processing the textile materials to select the proper solution and then control uniformly such vital factors as impregnation, subsequent stretching, drying or drying and curing while under tension, together with appropriate temperatures, time and speed of such processing machine units as set forth in my copending application.

It is important in stretching fibrous materials under tension to control the conditions. I have observed, if a length of textile material as mentioned is stretched under tension between two close centers, e.g., 2" apart and up to 75% of its breaking strength, that the fibers become distorted and break rather easily. However, if the same material is placed on centers 24" apart and under the same stress, it does not break, but the fibers are not stretched uniformly and have a kind of undulatory wave. This is especially true of staple fibers, particularly cotton. However, the same condition exists with the synthetic rayons but is not quite so pronounced. It appears that on close centers the textile material develops a shock, causing fiber-fatigue as the fiber structure cannot accommodate itself to the sudden change of state imposed by the stress. On the long centers the fiber structure has sufficient time to adjust itself to the stress. A staple cotton fiber having a length of 1 and ½" under stress loses about 30% of its substance strength, while a similar fiber ¾" long loses 50% of said strength. This condition exists in all cotton woven materials whether processed or not and may account for tearing near the seams in garments or other tight places under stress. It is apparent from these facts that there is an optimum distance that fibrous materials can be stretched in processing machines for best results. Of course, this distance depends on the material being processed. In this respect, cotton should have a longer stretching distance than the more plastic synthetic rayons, cotton being a more crystallized fiber substance. This condition exists to a more limited extent in the filament yarns, threads, cords and woven materials. This loss in tensile strength is not as much in the processed fibrous materials and is in proportion to the gain in tensile strength of the processed materials.

The instant invention comprises a machine for processing fibrous materials as described, in which it is possible to process said materials without the distortion and breakage of the fibers, yarns, threads, cords and woven materials, when stretched under tension as herein described, as well as elimination of the undulatory effect. In this respect the instant machine includes stretching means in which the distance between said means may be varied to correspond to the optimum distance required in processing respective materials, together with means for impregnating said materials and subsequently drying or drying and curing the same while under tension and variable means for controlling processing, positively and definitely as hereinafter described.

It is an object of this invention to provide a machine for processing fibrous materials, of the class described, said machine including variable means for impregnating said materials with various solutions and subsequently stretching, drying or drying and curing said materials while under tension through said machine.

It is another object of this invention to provide a machine adapted to the processing of fibrous materials of the class described, where said materials require impregnation by various solutions, subsequent stretching, drying or drying and curing under tension.

It is a further object of this invention to provide a machine adapted to the processing of fibrous materials of the class described, where said materials require positively controlled variable means for impregnation of various solutions, subsequent stretching, drying or drying and curing under tension.

Yet another object of this invention is to provide a continuous machine, adapted to the processing of fibrous materials, of the class described, where said materials require variable means for impregnation of various solutions, subsequent stretching, drying or drying and curing under tension, said means being positively controlled and driven in unison.

An additional object of this invention is to provide a machine adapted to the processing of dyed or gray fibrous materials of the class described where said materials require variable means for impregnation of various solutions, subsequent stretching, drying or drying and curing under tension, said means being positively controlled.

Other objects and advantages pertinent to this invention will be apparent to those familiar with the art to which it appertains. Reference is made to the accompanying description and drawings in which like numerals are used to designate like parts throughout the same as shown.

In the drawings:

FIGURE 1 is a schematic side elevation of the machine for carrying out the processing of the above mentioned fibrous materials;

FIGURE 2 is a top partially sectional view of the variable speed transmission for driving the variable spaced stretching rollers taken on lines 2—2 of FIGURE 3;

FIGURE 3 is a projected partially sectional view of the variable spaced stretching rollers taken on lines 3—3 of FIGURE 2;

FIGURE 4 is an end view of the variable spaced stretching rollers just outside of the variable speed transmission housing;

FIGURE 5 is a projected view of FIGURE 4 taken on staggered lines 5—5 of FIGURE 4; and FIGURE 6 is a top view looking down on the front end of the drying unit of the machine indicating by dotted lines the diverging parallel conveyor tracks of said machine.

Referring more specifically to the drawings, the apparatus as shown in FIGURE 1 includes loaded beam 50 on which is wrapped a woven cotton textile material 1 passing over to a scray 2 and up into a 3-roll mangle 3 containing a synthetic resin solution (e.g., 6% methylated melamine-formaldehyde, Aerotex M-3 and 6% polymerized ethyl acrylate), said mangle comprising a series of rollers as shown, of which rollers 4 are the usual coacting squeeze type for impregnating or padding said material. From rollers 4 the textile material moves upward and backward out of the solution, having been impregnated and padded, to coacting squeeze and tension rollers 5, 44. After the textile material passes between and over the top of rollers 5, 44, it passes across to spaced squeeze and tension rollers 6, 44, of similar construction. Rollers 5 and 6 are journalled in the housing 7 containing a twin variable-speed transmission of the P.I.V. type manufactured by the Link-Belt Company. This transmission permits a positive (no slippage) variable-speed gear ratio between rollers 5 and 6 as well as between these rollers and the power source. In this case, the transmission in housing 7 is driven by motor 8 and connected therewith by an enclosed silent chain as shown by numeral 15. On the back of the transmission are two hand wheels, one for changing the gear ratio of roller 5 and the motor, and one for changing the gear ratio of roller 6. By advancing the speed differential of one of these sets of rollers 5, 44, and 6, 44, the material thereon under tension is thereby stretched. For example, if the material being processed is held tightly between the squeeze and tension rollers 5, 44, rotating at a speed of 60 r.p.m., while rollers 6, 44, are rotating at a speed of 66 r.p.m., the speed differential would be 10% and would result in an increase in the length of the material of 10%, by stretching. The material at this point, having been treated with the resins in mangle 3, first squeezed by rollers 5, 44, stretched and then squeezed again by rollers 6, 44, passes over two idler rollers 52 and 54. It is now ready to be dried or dried and cured as the case may be. The material enters the first unit of the drying, curing and cooling machine 56, such as drying unit 9 where it is subjected to a temperature of 212° F. to 260° F. It then passes into curing unit 10 where it is subjected to an elevated temperature of 260° F. to 375° F. for 1 to 12 minutes, depending on the weight of the material and synthetic resin used. In this connection, units 9 and 10 may effectively be used as a single drying unit for thermoplastic resins by lowering the temperature in the curing unit 10 and a higher production obtained. Usually thermosetting resins require a higher temperature and a longer specific time for curing. The machine can be so proportioned in drying time to curing time that it is of maximum efficiency. The time of stay in each machine unit and lengths of the individual units are reciprocals of each other. The tenter frame of these units may be of the pin and/or clip design for good stability of the filling component in woven materials. The woven material 1 now passes into cooling unit 11 where it is cooled down to a temperature around 140° F., thereby stabilizing it, especially when the thermoplastic resins are used. The textile material is still under tension throughout its passage in machine 56. Cooling unit 11 may circulate room air at ambient temperatures or the air may be conditioned if desired to a suitable state. The material now passes between squeeze and tension coacting rollers 12.

It will be noted that the textile material has been under tension from rollers 5, 44, through the machine to said rollers 12. From this point the material can be slack washed to remove any uncondensed products therefrom, extracted and dried at a temperature between 212° F. and 260° F. Referring to drying unit 9, curing unit 10 and cooling unit 11, it is known in the art to provide tenter frames having adjustable means for narrowing or widening the conveyor tracks to suit various widths of materials. In FIGURE 6 the dotted lines show the diverging parallel conveyor tracks extending back for a short distance as indicated by numerals 17—17. The purpose of this divergence is to expand or stretch the filling component of the material gradually up to the desired width. In this way it will be seen that both the warp and filling components of the material are stretched while being processed in said units. The filling component of most materials has a shrinkage of 10 to 30% of the warp component. The conveyor tracks 17—17 may be adjusted or set by the usual hand wheel 13 to proper dimensions. Also shown in drying unit 9 and curing unit 10 are coacting rollers 58 and 60, 62 and 64, 66 and 68 at intervals which serve to stabilize the material under slight pressure while passing through the machine. The speed of these rollers is synchronized with the machine's speed. Therefore, the machine units, comprising the conveyor, the coacting stabilizing rollers in said units 9 and 10, as well as rollers 12, are driven in unison by a single variable-speed transmission 14, also of the P.I.V. type. Transmission 14 is driven by motor 8 mounted thereon and by an enclosed silent chain, which permits a variable-speed gear ratio between the speed of the motor and the drying speed of the machine units just mentioned. The transmission also provides by this arrangement for the "lag or lead" of the material being processed and may be controlled to an exact limit to compensate for too much shrinkage or too much stretching due to drying temperatures or "underfeeding or "over-feeding" the machine. This control can be effected with the aid of hand wheel 16 on transmission 14. This transmisison also allows the speeding up of the machine for higher production or vice-versa, when the two hand wheels 18 and 19 of the twin variable-speed transmission 7 are adjusted according to the speed of the machine 56. The construction of rollers 5 and 6 and transmission 7 is shown in more detail in enlarged FIGURE 2 and FIGURE 3. As seen in these views, the housing of variable-speed rollers 5 and 6 is integral with the housing proper of transmission 7. Hand wheel 18 is for controlling the gear ratio or speed of roller 5, while hand wheel 19 controls roller 6. Motor 8 is connected by a silent chain 15 (FIG. 1) to drive shaft 20 of the transmission. Roller 5 has journal 21 and roller 6 has journal 22. Journal 22 is rotatably mounted in the housing of the transmission. Journal 21 is rotatably mounted in a block-bearing 23 adapted to slide on faces 24—24 which are integral with said housing. By this construction, said bearing and roller 5 may be spaced at any distance (center to center) relative to roller 6 within the travel of the bearing. The bearing can be set for spaced relation by hand wheel 25, as shown in FIGURE 3. Hand wheel 25 is rotatably mounted in a boss integral with the housing of the transmission on a shaft 26 which is provided with a tooled collar to prevent lateral movement in the boss, as shown. The shaft is threaded and extends into a boss 27 which is also threaded. Boss 27 is an up-turned integral part of the block-bearing.

It will be observed that when hand wheel 25 is rotated in either direction, bearing 23 will travel between its extremes for any desired spaced relation of rollers 5 and 6. Mounted on journal 21 and keyed thereto is a worm gear 28 which coacts with rotatably mounted worm 29 journalled in the housing of the transmission on which is keyed a spur gear 30 which coacts with rotatably mounted spur gear 31, on the extended end of which is a bevel gear 32. These gears are supported by pin 33 secured in the housing of the transmisison. Gear 32 coacts with bevel gear 34 keyed on power shaft 35 of the transmission. Therefore, when power shaft 35 is actuated, roller 5 is also actuated and yet this roller may be set for any spaced relation desired between it and roller 6 by hand wheel 25 as described.

This construction represents the left or power side of the stretching or tension means. The right side parallel to said means has no power source or transmission. The housing thereof consists only of a corresponding construction including block-bearing 23 which is a support for this end of roller 5 by journal 21. This bearing is also adapted to slide on faces 24—24 as on the left side. The hand wheel 25 is set for spaced relation as described on the left side. No gearing is employed on the right side and it is merely a support for alignment purpose, together with adjustment means for a variable spaced relation. However, if desired a cross-shaft with bevel gearing could synchronize both hand wheels 25 and control would remain on the left side.

As seen in FIGURES 4 and 5, squeeze rollers 44 are provided for both rollers 5 and 6 in which a depending yoke-bearing is represented by numeral 36 on roller 6 and a similar bearing 36' on roller 5. The bearings proper are designated by numeral 37. Bearing 36 comprises a web depending integrally with bearing 37 and an integral boxing 38 at the bottom, in which is riveted a square steel bar 39 enclosed by boxing 40 integral with said bearing 36' as shown. Bearing 36' is adapted to slide on bar 39 for the purpose of a spaced relation between rollers 5 and 6. The rollers are shown on close centers in FIGURE 4. In the webs of bearings 36 and 36' are disposed therethrough oscillatory shafts 41 which extend across to a similar construction at the right ends of rollers 5 and 6. These shafts are keyed into oscillatory levers 42 and act as a fulcrum for the levers. On one end of the levers are radial arms comprising sleeve bearings 43 in which squeeze rollers 44 are journalled. The other end of the levers are much longer for leverage and comprise handles for manipulation as well as a spring self-restoring latch pawl for engaging with notches on quadrant 45, which is riveted to the bearings 36 and 36' as shown. It will be observed that when levers 42 are pulled down, rollers 44 are pushed up against tension rollers 5 and 6 for squeeze purposes while when the levers 42 are pushed up, rollers 44 are released, e.g., to aid in loading the machine or for adjustment of solution pick-up by selection of the proper notch on the quadrant. No levers or quadrants are used at the right ends of the squeeze rollers. The radial arms with bearings 43 carry out their function in connection with shafts 41 on which they are keyed. Therefore, when the handles of the levers are manipulated on the left side, the torque is also transmitted to the right side by the cross-shafts. It will also be understood in this construction that roller 6 and its squeeze roller 44 have a fixed position, whereas roller 5 and its squeeze roller 44 do not, therefore permitting a variable-speed relation between the rollers as described.

It is to be understood that while the above described machine may be used for the complete process of continuously treating fibrous materials and the like with synthetic resins, of the thermoplastic or thermosetting type or blends thereof, it may be desirable to use the machine solely as a drying unit in processing, involving thermosetting resins by lowering the temperature of curing unit 10, since the textile material is temporarily stabilized dimensionally by the drying. In this case, the textile material is moved to other curing units already available in the plant. In this way production may be increased and the cost lowered in processing.

It is understood, while the processing of a woven material has been described as an example of my invention, that the machine is equally efficient in processing fibrous materials, such as yarns, threads, cords and the like. In such case, the materials may be supplied to the machine on beams or other supply means so long as they have been prepared or delivered to the machine in the same relative plane. Again, the materials may be supplied as a warp, or warp superimposed upon warp for production purposes, as well as tow or rope, and to the limit of practicability, the machine imparting the same benefits to the materials as though a woven material without filling component were used.

It may be noted, in conventional processing of fibrous materials, particularly the woven materials, that it is known in the art when synthetic resins are used such as the thermosetting resins, it is important to impregnate or pad the solution under much pressure into the core of the fibers, yarns and threads of the materials before drying and curing. If this is not done, the solution will quickly come to the surface or remain thereon and when processed the material will have a stiff or harsh hand. Although this is general practice, it is not as effective as might be presumed and is responsible for a lot of discarded materials. In fact, when the squeeze rollers compress the material to a higher density, thereby driving in the solution, the very instant this pressure is released by passing through the solution, the solution will immediately come to the surface by capillary attraction, osmotic pressure and lowered surface tension. Therefore, when the material is dried and cured in this state, a stiff and harsh hand results. "Over-feeding" any machine to overcome this defect is not the answer.

In my invention these inherent difficulties have been practically eliminated. The material is padded under moderate pressure by submerged squeeze rollers, then again between a set of squeeze and tension rollers, where it passes across to another set of squeeze and tension rollers of a higher speed whereby the material has been stretched by the snubbing effect of said tension rollers and held under tension. In this way the solution is held in the core of the fibers, yarns and threads by compression of the stretched material between said tension rollers and any excess solution that comes to the surface thereof while being stretched is squeezed off by the latter set of squeeze and tension rollers as herein described. This last squeezing of the material is very important, especially when processing fibrous materials of the class described and as described relative to my machine and the objects set forth as stated, it being understood, that various modifications including arrangement of component parts, construction, functioning and control thereof may be made and limitation thereof is only by the appended claims, in which "of the class described" refers to fibrous materials.

It will be appreciated by those skilled in the art that it is possible to dry the resins in the machine of the instant invention and subsequently cure the fibrous materials under tension in another part of the plant.

I claim:

1. In an apparatus for continuously processing a web of fibrous material: a tank filled with a solution for impregnating the web of fibrous material; means positioned above said tank for squeezing and placing the web under tension longitudinally of the same as the web is received from the tank, said means including a first pair of squeezing rollers for receiving the web therebetween as it is fed from the tank, a second pair of squeezing rollers spaced from and parallel to said first pair of squeezing rollers for receiving the web therebetween from said first pair of squeezing rollers; means to drive at least one roller of said first pair of rollers and one roller of said second pair of rollers, said drive means including means to rotate the driven roller of said second pair faster than the driven roller of said first pair; a tenter conveyor receiving said web from said squeezing and tensioning means and placing the web under tension transversely of the same; and means cooperating with said tenter conveyor for maintaining tension on said web longitudinally of the same.

2. An apparatus of the character described in claim 1 wherein said last mentioned means cooperating with said tenter conveyor includes a plurality of pairs of rollers extending transversely of said tenter conveyor and spaced from each other, said plurality of pairs of rollers being driven at least as fast as the driven roller of said second pair of squeeze and tension rollers.

3. An apparatus of the character described in claim 2 including means independent of said first mentioned drive means for driving said tenter conveyor and said plurality of pairs of tension rollers.

4. An apparatus of the character described in claim 3 including a unitary source of power coupled to said first and second drive means.

5. An apparatus of the character described in claim 3 including means to vary the speed of the first drive means; and means to vary the speed of said second mentioned drive means.

6. An apparatus of the character described in claim 1 including means to selectively adjust the position between said first and second pair of squeezing and tension rollers while maintaining the axes parallel.

7. An apparatus of the character described in claim 1 including means to adjust the position of one roller of each of said first and second pair of squeezing and tensioning rollers with respect to the other roller of the same pair.

8. An apparatus of the character described in claim 1 including means to successively dry, cure and cool said web of fibrous material while said web is under tension of said tenter conveyor and said plurality of pairs of tensioning rollers.

9. In an apparatus for continuously processing fibrous material: a tank containing a solution for impregnating the material; means for squeezing and placing the material under longitudinal tension as fed from said tank, including squeezing feed rollers for receiving the material therebetween as fed from said tank, and squeezing take-off rollers variably spaced from and parallel to said squeezing feed rollers for receiving the material therebetween from said squeezing feed rollers; driving means for rotating said squeezing take-off rollers faster than said squeezing feed rollers; a tenter conveyor receiving said material from said squeezing and tensioning means for placing the material under tension therethrough.

10. An apparatus of the character described in claim 9 including means to adjust the position of said feed rollers relative to one another.

11. Apparatus of the character described in claim 9 wherein said driving means includes means to independently adjust the speeds of rotation of a driven roller of said squeezing feed rollers and a driven roller of said squeezing take-off rollers.

12. Apparatus of the character described in claim 9 including means independent of said driving means for driving said tenter conveyor.

References Cited in the file of this patent

UNITED STATES PATENTS

| | | |
|---|---|---|
| 1,531,826 | Wigglesworth | Mar. 31, 1925 |
| 1,719,612 | Kenyon | July 2, 1929 |
| 1,723,336 | Eaton | Aug. 6, 1929 |
| 2,083,142 | Buck | June 8, 1937 |
| 2,173,997 | Burgeni | Sept. 26, 1939 |
| 2,239,636 | Weiss | Apr. 22, 1941 |
| 2,251,127 | Gessner | July 29, 1941 |
| 2,275,278 | Andrews | Mar. 3, 1942 |
| 2,327,712 | Huey et al. | Aug. 24, 1943 |
| 2,338,983 | Thackston et al. | Jan. 11, 1944 |
| 2,591,861 | Pannaci | Apr. 8, 1952 |